Jan. 17, 1928.

E. C. HEAD ET AL

GEAR CUTTING MACHINE

Filed Oct. 22, 1926

INVENTORS
Ernest C. Head
Eyvind Finsen
BY L. O. Carlsen
ATTORNEY

Jan. 17, 1928.

E. C. HEAD ET AL 1,656,633

GEAR CUTTING MACHINE

Filed Oct. 22, 1926

INVENTORS
*Ernest C. Head*
*Eyvind Finsen*
BY *L. O. Carlsen*

B. E. Schlesinger
ATTORNEY

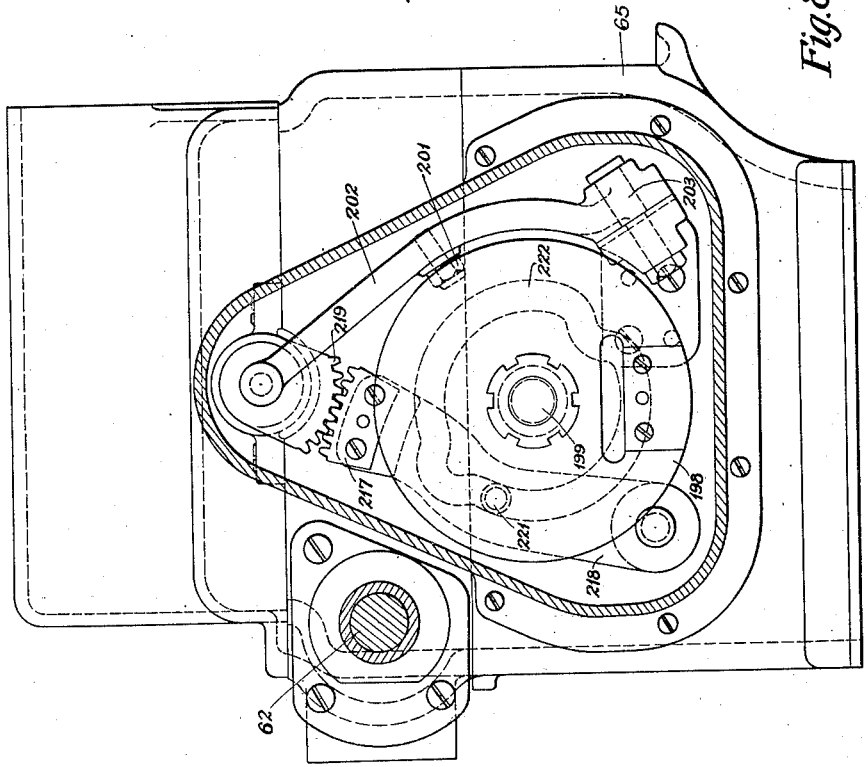
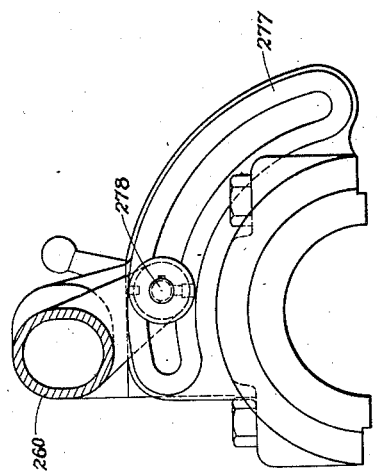

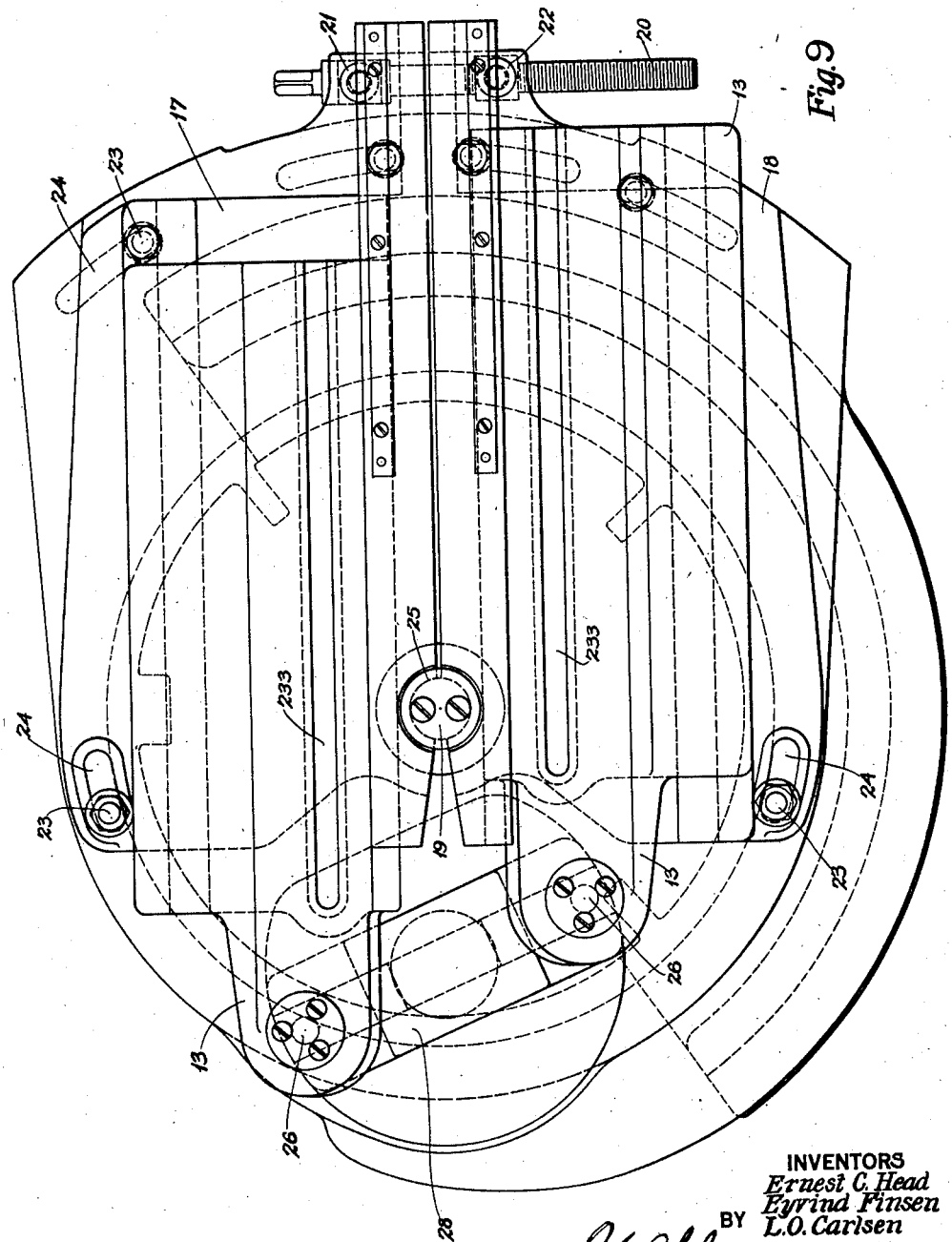

Jan. 17, 1928.

E. C. HEAD ET AL 1,656,633

GEAR CUTTING MACHINE

Filed Oct. 22, 1926

INVENTORS
Ernest C. Head
Eyvind Finsen
BY L. O. Carlsen
ATTORNEY

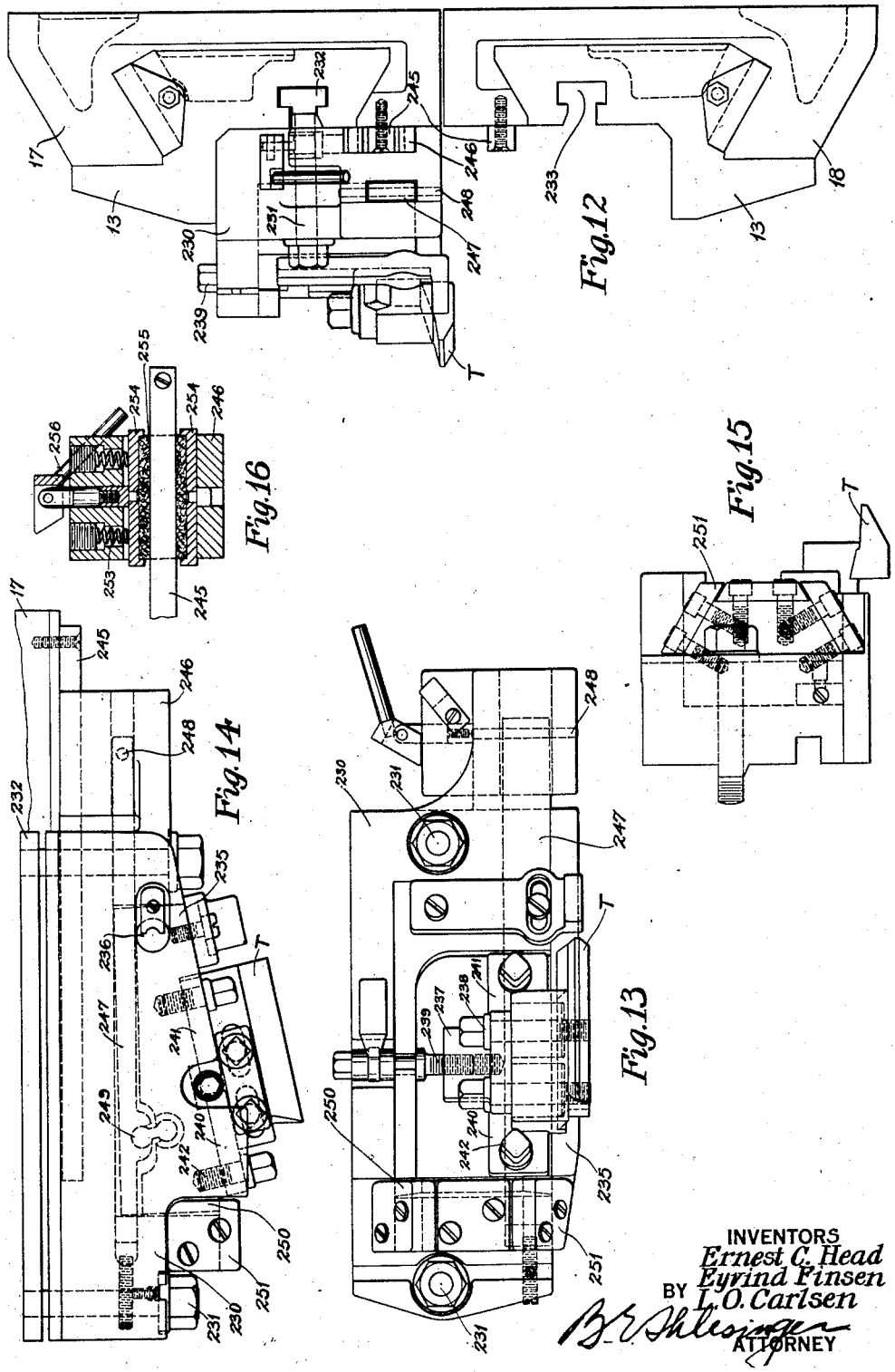

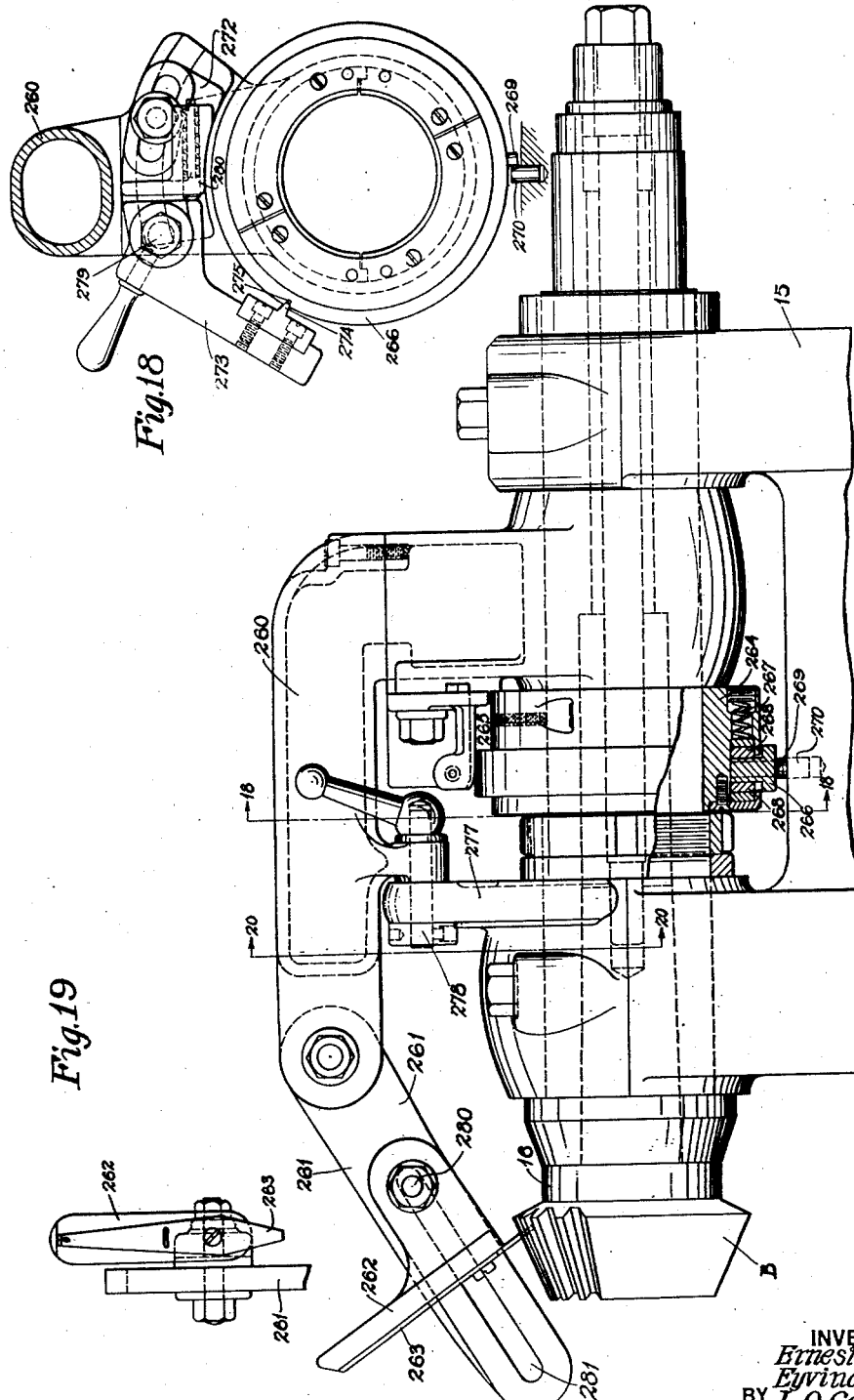

Jan. 17, 1928.  1,656,633

E. C. HEAD ET AL

GEAR CUTTING MACHINE

Filed Oct. 22, 1926    13 Sheets-Sheet 13

INVENTORS
Ernest C. Head
Eyvind Finsen
L. O. Carlsen
BY
ATTORNEY

Patented Jan. 17, 1928.

1,656,633

UNITED STATES PATENT OFFICE.

ERNEST C. HEAD, EYVIND FINSEN, AND LEONARD O. CARLSEN, OF ROCHESTER, NEW YORK, ASSIGNORS TO GLEASON WORKS, OF ROCHESTER, NEW YORK, A CORPORATION OF NEW YORK.

GEAR-CUTTING MACHINE.

Application filed October 22, 1926. Serial No. 143,481.

The subject of the present invention is a machine for producing gears and in particular the present invention relates to a machine for producing gears from tapered blanks. In a more specific aspect, the present invention relates to machines of the reciprocating tool type, in which a relative generating or rolling motion is imparted between the tool and gear blank in order to generate the tooth profiles.

In general, the purposes of this invention are to provide a machine which will be more rigid, more accurate, and which will operate more rapidly than previous machines of a similar nature.

In machines of the class referred to, it is customary to complete one tooth or one side of a tooth and then separate the gear blank and tool mechanism, to permit of indexing the blank, and one of the purposes of the present invention is to provide a construction whereby, after the completion of each cutting operation, the blank is moved clear of the tools more quickly than in previous machines, so that the indexing operation can be started and completed sooner and the idle period of the machine thereby be greatly reduced.

A further purpose of this invention is to provide an improved form of machine for cutting tapered gears, in which the blank carrier and slide are moved away from the tools in such manner that a gear or blank may be readily chucked on or removed from the blank spindle.

A further object of the present invention is to provide an improved form of tool mechanism by means of which the tools will be held rigidly, during the cutting operation, against movement in any direction, thereby preventing any chatter.

A further purpose of the present invention is to afford means for readily adapting the machine for roughing out an uncut blank or for finishing a previously roughed blank.

Other objects of the invention are to provide means for accurately positioning the blank on the machine initially and after each indexing operation and to afford a construction through which the gears controlling the operation of the machine may be correctly and conveniently synchronized.

Other objects of the invention will be apparent hereinafter from the disclosure and from the recital of the appended claims.

A preferred embodiment of the invention is illustrated in the accompanying drawings. It will be understood, however, that the invention is capable of modification within its scope and the limits of the appended claims.

In the drawings:

Fig. 8 is a section taken generally on the line 8—8 of Fig. 2, looking in the direction of the arrow;

Fig. 9 is a front elevation showing the tool slides and cradle;

Fig. 12 is an end elevation of the tool slides and arms showing one of the tools in position;

Fig. 13 is a front elevation of the tool block;

Fig. 14 is a plan view of the parts shown in Fig. 13;

Fig. 15 is an end view thereof;

Fig. 16 is a detail of the friction box which controls the movement of the clapper block;

Fig. 17 is an enlarged side elevation showing the mountings for the blank spindle and the stock dividing apparatus;

Fig. 18 is a section on the line 18—18 of Fig. 17;

Fig. 19 is a detail of the stock dividing apparatus;

Fig. 20 is a section on the line 20—20 of Fig. 17;

Figure 1:
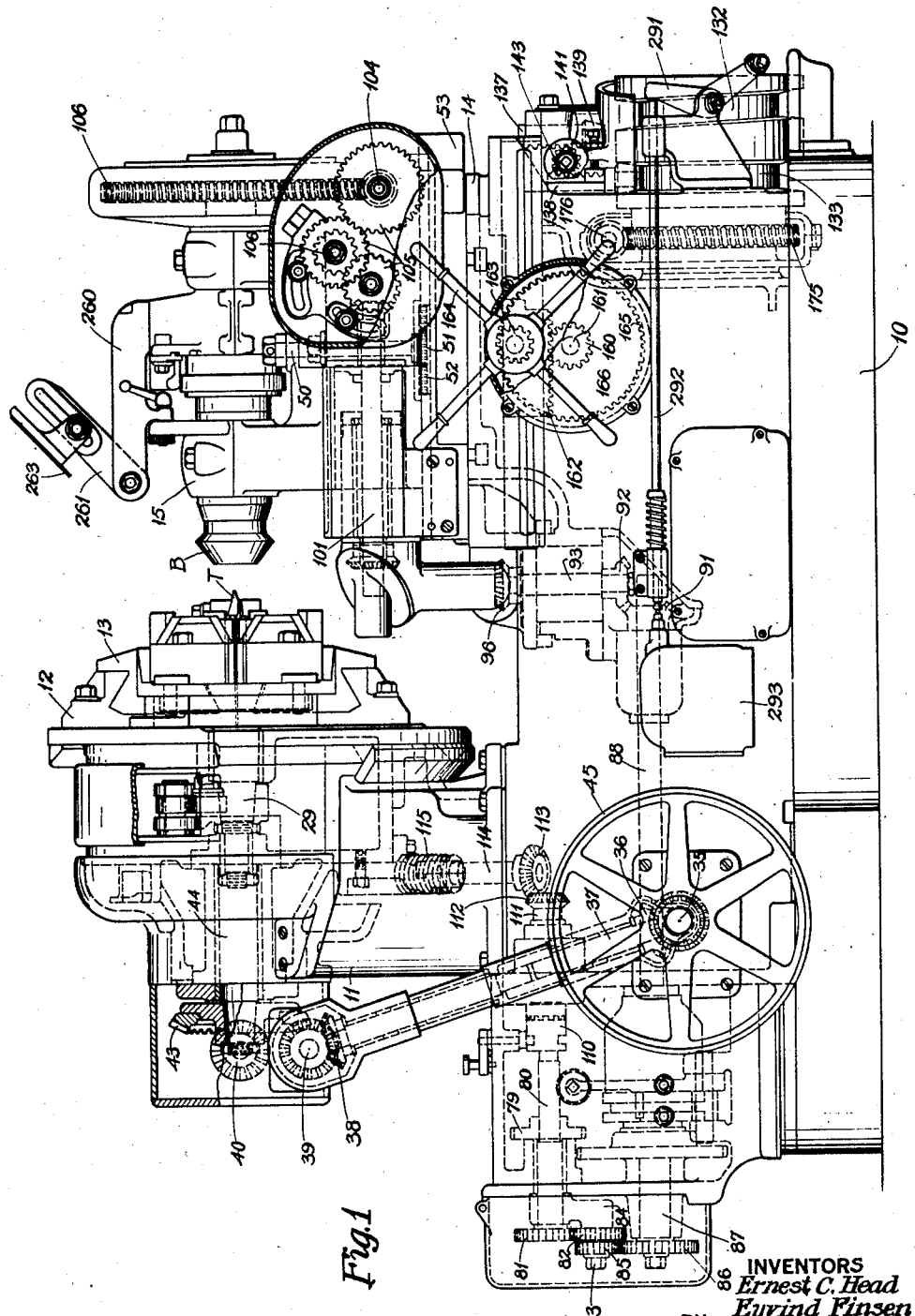
Fig. 1 is a side elevation of a machine constructed according to the preferred embodiment of our invention, showing the tool mechanism and blank disengaged.

During the cutting operation of the machine illustrated, the blank rotates on its axis, and during such rotation, the tools are reciprocated across the face of the blank. Simultaneously therewith a relative movement is imparted between tool and blank on an axis corresponding to the axis of the basic gear with which during the generating operation the blank is theoretically rolled. The generating motion is effected, in the machine shown, by an oscillatory movement of the cradle or carrier upon which the tool mechanism is mounted. The axis of this cradle or carrier represents the axis of the basic generating gear. After a tooth has been cut, the tool and blank are withdrawn realtively to each other and the blank indexed. The relative withdrawal is effected, in the machine illustrated by a movement of the blank support in a direction perpendicular to the plane of operation of the tools and parallel to the axis of the cradle.

Referring to the drawings by numerals of reference, 10 indicates the bed or base of the machine. On this bed or base 10 is mounted an upright 11, in which is journaled the cradle 12 on which are mounted the tool slides 13, carrying the tools T. The bed or frame 10, serves, also, as a support, upon which the blank support or carrier 14 is slidable. Mounted for adjustment on the blank support or carrier 14 is the blank head 15 in which is journaled the blank spindle 16 upon which the blank B is secured.

Figure 10:
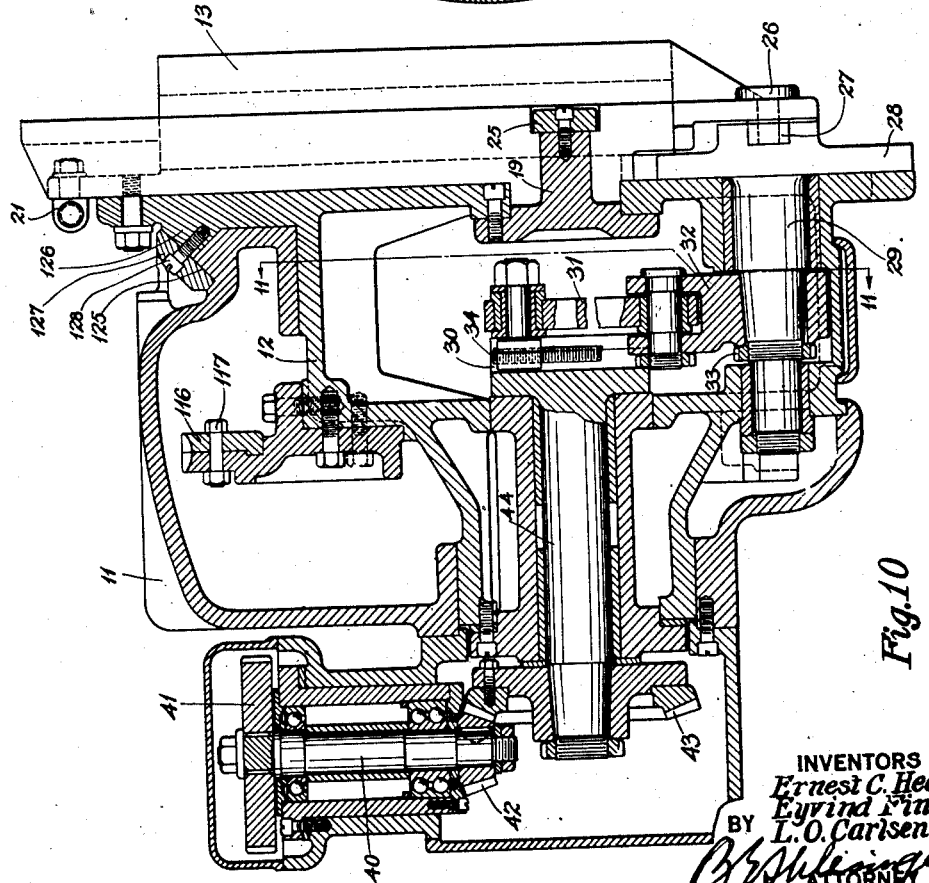
Fig. 10 is a horizontal sectional view through the cradle showing the tool drive.

There are two tool slides 13 (see Figs. 1, 9 and 12) and on each is mounted tool mechanism, as will be described later in detail. The tool slides reciprocate on the arms 17 and 18 which are adjustably secured to the face of the cradle 12 (Figs. 9 and 10). Suitable guide surfaces are provided on the slides and arms, as shown more particularly in Fig. 12, to restrain and guide the slides in their reciprocatory movement. The arms 17 and 18 are pivotally mounted on the stud 19 which is secured to the cradle and may be angularly adjusted relative to each other so as to position the tools for cutting gears of various tooth angles. The angular adjustment of the arms is effected by rotating the screw 20 which is mounted in a nut 21 swivelly secured to the arm 17 and threads into a nut 22 swivelly secured to the arm 18, one arm being held in fixed position while the other is adjusted and then the latter is held in fixed position while the first is adjusted. The arms may be secured in any position of their angular adjustment by means of the bolts 23 which engage in slots 24 in the face of the cradle and by means of the cap 25 which serves to clamp the arm on the stud 19.

Figure 11:
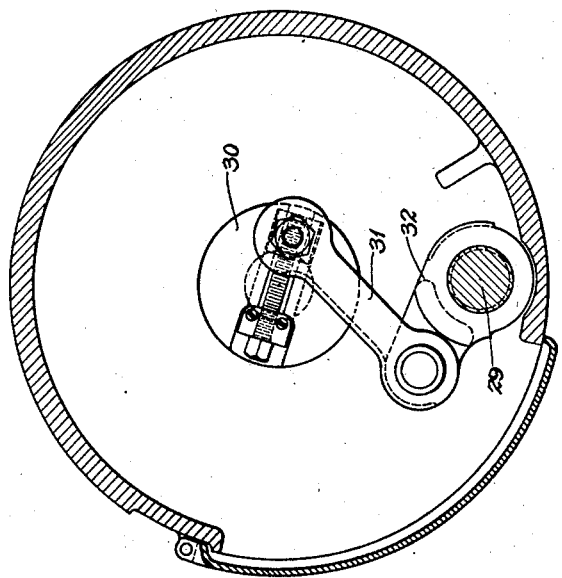
Fig. 11 is a section on the line 11—11 of Fig. 10.

The mechanism for reciprocating the tool slides will be described next. The tool slides 13 are each connected by means of a pin 26 (Figs. 9 and 10) to a block 27. The blocks 27 slide in a groove provided in the actuating member 28. This actuating member 28 is formed integral with an arbor 29 which is journaled in suitable bearings in the cradle. The actuating member is oscillated to reciprocate the tool slides by means of a crank 30 which is connected by means of the link 31, arm 32 and nut 33 with the arbor 29 (Figs. 10 and 11). The throw of the crank may be adjusted by means of the screw and block indicated generally at 34 and which are usual in such apparatus.

The crank 30 is driven from the pulley shaft 35 by means of the miter gears 36 (Figs. 1, 3 and 10), the shaft 37, the miter gears 38, the shaft 39 which is journaled in the upright 11, the shaft 40 which is also journaled in said upright, the speed change gears 41 connecting the shafts 39 and 40, the pinion 42 which is keyed to the shaft 40, and the bevel gear 43 which is secured to the spindle 44 of said crank 30. The pulley shaft 35 has secured to it a pulley 45 which may be driven from any suitable source of power.

The blank is mounted for both axial and angular adjustment in order that it may be set to the proper cone distance and into the proper tangential plane for operation upon by the tool. The axial adjustment is secured by rotating the stud 50 (Figs. 1 and 2) which is journaled in the blank head 15 and which carries a pinion 51 which meshes with a rack 52 which is secured to the blank head carrier 53. The blank head may be secured in any position of its axial adjustment by means of bolts 54 (Fig. 5) which are provided with T-heads which take into T-slots in the blank head carrier 53. This axial adjustment enables the blank to be set at various distances away from the center line of the machine whereby gears of different cone distances may be cut.

Figure 2:
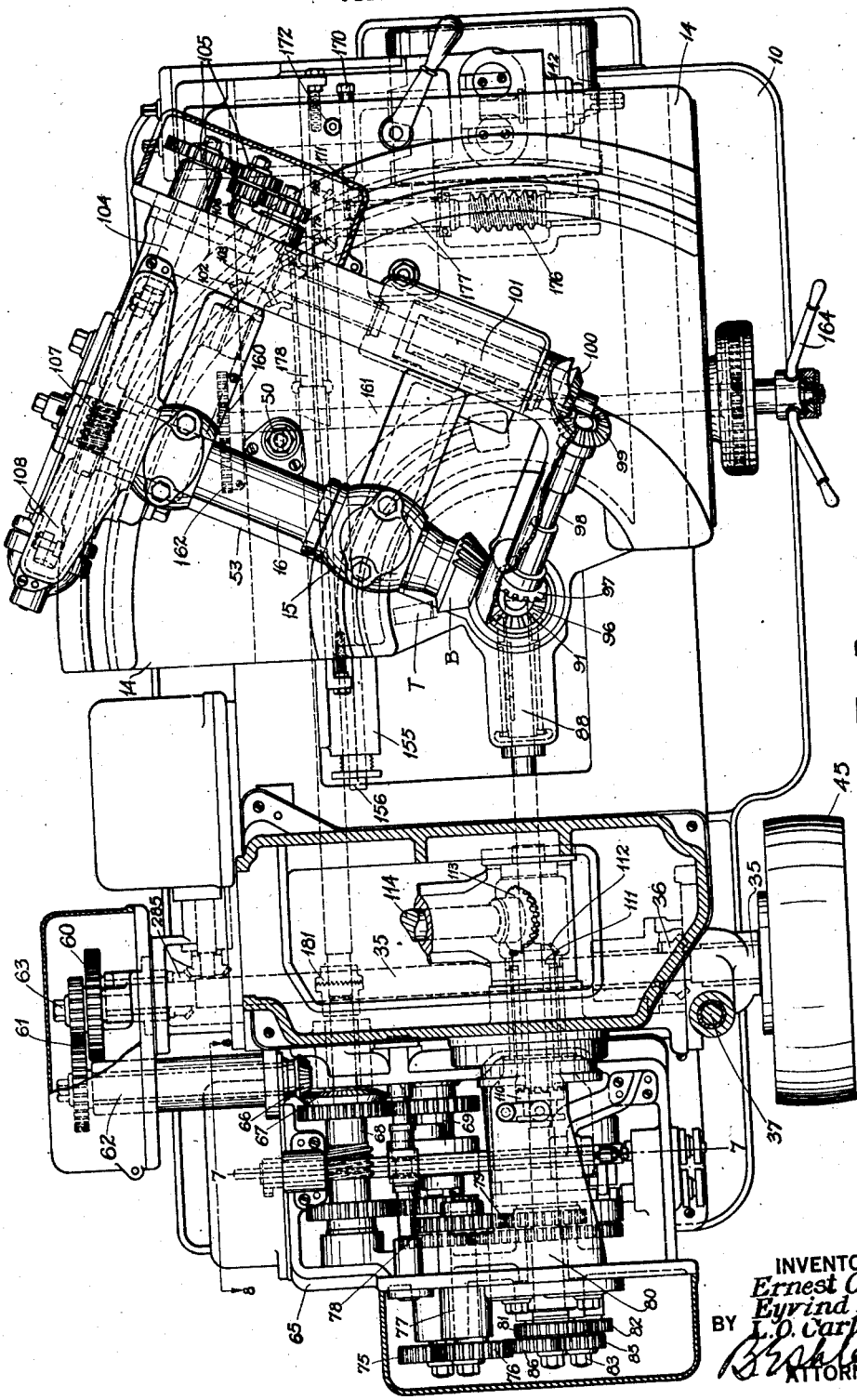
Fig. 2 is a plan view, with parts broken away of the apparatus shown in Fig. 1.

The blank head carrier 53 is angularly adjustable on the support 14, whereby the blank may be positioned in the proper cutting plane relative to the tools as illustrated in Fig. 2. This angular adjustment may be effected by a gear and a segment or by hand as may be desirable.

During the cutting operation of the tools as previously described, the blank is rotated on its axis. During the cutting operation the blank rotation is so proportioned to the cradle movement that the tools and blank are moved relatively to each other in the manner of a gear meshing with a basic crown gear. The means for imparting the rotary movement, during cutting to the blank will be described next.

Mounted on the shaft 35 adjacent the end which is remote from the pulley 45 (Figs. 2 and 3) is a spur gear 60 which forms one of a set of feed change gears 61, which operatively connect the shafts 35 and 62 and the stub shaft 63. Secured to the shaft 62, which is journaled in a detachable bracket 65, is a bevel pinion 66 which meshes with a bevel gear 67 (Figs. 2, 3 and 6) which is secured to the back shaft 68 which is journaled in the bracket 65. Mounted adjacent the shaft 68 and also journaled in the bracket 65 is a reversible shaft 69, which is adapted to be driven in opposite directions from the shaft 68 by any suitable type of reversing mechanism, the type shown being that described in U. S. Patent No. 1,203,608, issued to Gleason et al., November 7, 1916. Reference may be had to that patent for a more detailed description of this reversing mechanism. It is sufficient to say here, that the shaft 69 may be driven from the shaft 68 either through the gears 70 and 71 or through the gear 72, idler 73 and gear 74.

Secured to the reversible shaft 69 adjacent its outer end is a spur gear 75 which meshes with a spur gear 76 which is secured to a shaft 77 which is journaled in the frame of the machine. The gears 75 and 76 form a set of roll change gears governing the amount of roll of the cradle during the cutting operation. The shaft 77 carries a spur gear 78 which meshes with a spur gear 79 fastened on the shaft 80 which is mounted in the frame of the machine. Secured to the shaft 80 adjacent its outer end is a spur gear 81 (see also Fig. 1) which meshes with a spur gear 82 secured to the shaft 83. The shaft 83 is journaled in the quadrant 84 which is adjustably secured to the frame of the machine, and carries a spur pinion 85 which meshes with a spur gear 86 which is secured to the shaft 87. The shaft 87 is journaled in the bracket 65. The shafts 80 and 87 are arranged one above the other and are parallel. The gears 81, 82, 85 and 86 form a set of ratio roll change gears, governing the ratio of the blank rotation to the cradle movement during the cutting operation.

Figure 5:
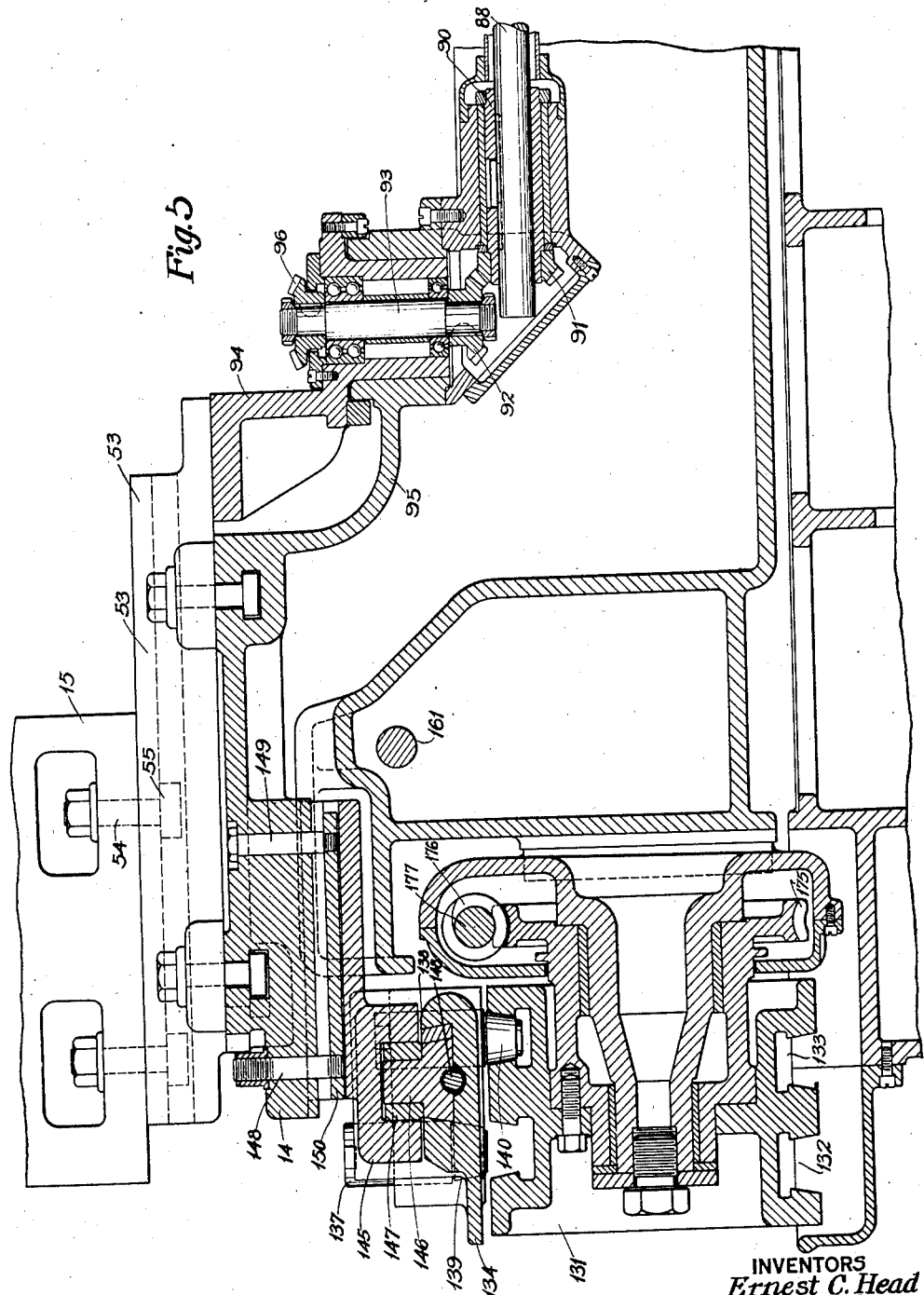
Fig. 5 is a sectional view taken generally on the line 5—5 of Fig. 4.
Figure 6:
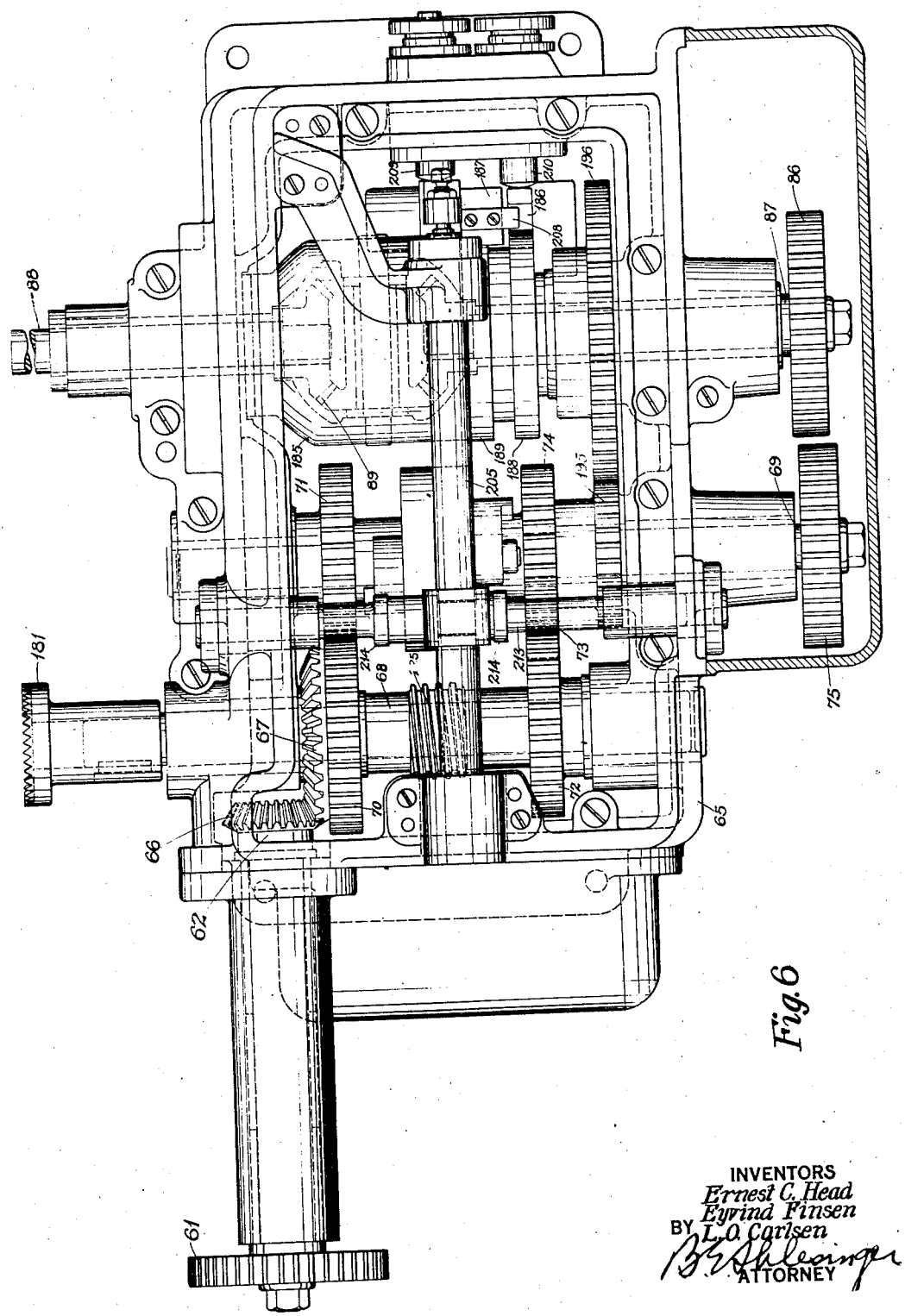
Fig. 6 is a plan view of the detachable control unit.

The shaft 87 drives the aligned shaft 88, which is also journaled in the bracket 65, through the differential gears 89 (Fig. 6). The shaft 88 has a splined connection with a sleeve 90 (Figs. 1, 2 and 5), which is journaled in a suitable bearing in the blank support 14. Secured to the sleeve 90 is a bevel gear 91 which meshes with a bevel gear 92 which is keyed to a vertical shaft 93. The shaft 93 is journaled in a suitable bearing in an extension 94 of the blank-head carrier 53 (see Fig. 5). The extension 94 is itself swively mounted in a suitable bearing provided in an extension 95 of the blank support 14. It is about the axis of the shaft 93 that the angular adjustment of the blank head carrier, already referred to, take place. The splined connection of the shaft 88 with the sleeve 90 permits of the feed movement of the blank support 14, which will be more particularly described hereinafter.

The vertical shaft 93 has keyed to it adjacent its outer end a bevel gear 96. This gear 96 meshes with a bevel gear 97 on the oblique shaft 98. The shaft 98 is journaled in a bracket secured to the blank head carrier 53 and carries on its upper end a miter gear 99 which meshes with a miter gear 100 which is secured to the telescoping shaft 101 which is journaled in the blank head carrier 53. The shaft 101 is connected through a pair of miter gears 102 to a shaft 103 which is journaled in the blank head. The shaft 103 drives the worm shaft 104 through the index change gears 105 and the stub shaft 106. The worm shaft 104 carries a worm 107 which meshes with a worm wheel 108 which is secured to the blank spindle 16. The index change gears 105 govern the number of teeth to be produced in the blank.

The blank is rotated during the cutting operation through the gearing just described. The rotation of the blank on its axis together with a movement of the cradle on its axis, during the cutting operation, serves to produce the required rolling motion necessary to generate the tooth profiles. The means for moving the cradle will now be described.

Connected to the shaft 80, already referred to, through a backlash clutch 110 of any suitable structure (Figs. 1 and 2) is an aligned shaft 111 which is journaled in a suitable bearing in the frame of the machine. The shaft 111 carries a bevel gear 112 which meshes with a bevel gear 113 secured to the diagonal worm shaft 114. The worm shaft 114 carries a worm 115 which meshes with the worm wheel segment 116 which is secured to the cradle 12 (see Figs. 3 and 10). The cradle, hence, is driven from the reversible shaft 69 through the roll change gears 75 and 76, the shaft 77, the gears 78 and 79 (see Fig. 2) the shaft 80, the shaft 111, the bevel gears 112 and 113, the shaft 114, the worm 115, and the worm wheel 116.

The worm wheel segment 116 is preferably made in two parts, as shown in Fig. 10 bolted together by bolts 117 so that it can be cut as accurately as possible. The worm wheel segment is supported at a relatively remote distance from the axis of the cradle, which corresponds with the axis of the spindle 44 (see Fig. 10), whereby the effect of any error in the worm wheel segment upon the motion of the cradle is reduced to a minimum. The worm shaft 114 is suitably journaled in a bracket 118 (Fig. 3) which is mounted for pivotal adjustment about an axis coinciding with the axis of the shaft 111. The worm 115 is held in engagement with the worm wheel segment 116 by means of a set screw 119 which threads into a bracket 120 formed on the column 11 and which engages the housing 118 for the worm shaft 114. The set screw 119 serves as a means for adjusting the depth of mesh of the worm 115 and the worm wheel segment 116 and as a means, also, of taking up any play or backlash in these gears.

To further insure the utmost accuracy in the cradle movement, a guideway 125 (Figs. 1 and 10) is formed on the column 11 concentric with the axis of the cradle and the cradle is provided with a guide rail 126 concentric with its axis cooperating with the guideway 125. The form of guide rail and guideway and the means for holding the guide rail on the guideway during the oscillation of the cradle constitutes one of the novel features of the present invention. The guideway 125 is V-shaped. The guide rail 126 is also V-shaped and one face of the guide rail 126 contacts with an adjacent face of the guideway 125. An arcuate gib 127, which has an inner surface which is inclined to the axis of the cradle, serves to hold the guide rail on the guideway during the cradle oscillation. The inner face of the gib 127 contacts and cooperates with the outer faces of the guideway 125 and the guide rail 126 respectively. The gib 127 is secured to the rail 126 by means of screws 128. The construction described insures a vibrationless movement of the cradle and permits of taking up any play readily.

After a tooth or tooth space of the blank has been cut, the tool and blank are withdrawn relatively to each other and the blank indexed. The means for effecting the relative withdrawal of tool and blank will now be described.

Heretofore in machines for producing gears from tapered blanks, as bevel gears, the blank has been withdrawn from engagement with the tool by swinging the blank head carrier angularly on its support about an axis passing through the apex of the blank. In the present machine, the blank is withdrawn from engagement with the tool, for indexing and for removal and chucking, by a movement of the blank support in a direction perpendicular to the plane of operation of the tools. With the improved construction the blank clears the tools sooner than in previous constructions and consequently the indexing can be started and completed sooner than in previous constructions, so that the idle period of the machine is greatly reduced and the gears cut in a much shorter time than was heretofore possible. With the improved construction, also, the blank can be positioned on or removed from its spindle more readily than in previous constructions. The new construction also makes for rigidity, as the movement of the blank support is a straight line motion instead of angular motion and less strain is applied to the operating parts.

Figure 4:
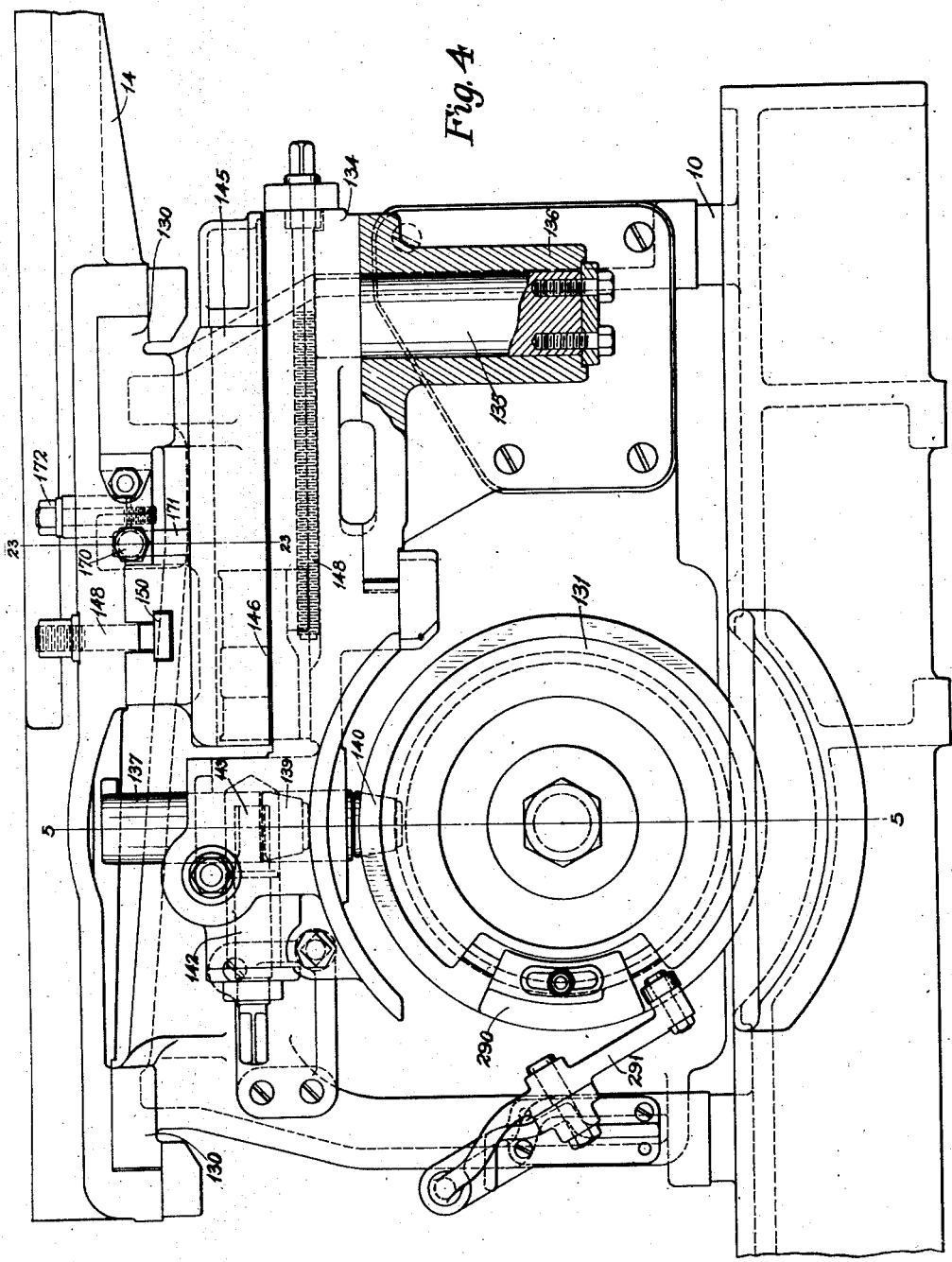
Fig. 4 is a partial end elevation of the opposite end of the machine.

The movement of the blank support 14 on the bed 10, for feeding and indexing, is guided by means of the rails 130 (see Fig. 4) formed on the base 10 and is governed by a cam 131 (Figs. 4 and 5). The cam 131 is provided with two cam ways one of which 132 is employed during the roughing operation and the other of which 133 is employed during the finishing operation. The cam is connected by means of a cam lever 134 with the blank support 14. The cam lever 134 is pivotally mounted on the frame or bed 10, being provided with a spindle 135 which is journaled in a suitable bearing 136 formed on the bed. Reciprocably mounted on the cam lever 134 are a pair of followers 137 and 138, carrying rollers 139 and 140 which are adapted to be engaged, one with the cam way 132 and the other with the cam way 133. Secured to each of the followers 137 and 138 is a rack 141 (see Fig. 1). A stub shaft 142 journaled in the lever 134 carries a spur pinion 143 which meshes with both racks 141. Rotation of the pinion 143 causes the followers 137 and 138 to move in opposite directions, whereby one of the rollers 139 or 140 is engaged with one of the cam ways 132 or 133 while the other is disengaged therefrom. The pinion 143 can be rotated by applying a wrench to the end of the stub shaft 142.

For roughing out an uncut gear blank, it is necessary to feed the blank slowly in toward the tool during the reciprocating movement of the latter and when the blank has been fed a sufficient distance for the tools to cut to the full depth of the teeth the blank is withdrawn preferably by a quick movement and then indexed. In a finishing operation, however, where the teeth have been previously roughed out, it is desirable to feed the blank carrier quickly towards the tools until the tools have reached the full depth position so that the cutting operation will take place principally on the sides of the teeth to produce the proper tooth profile, and at the end of finish cutting operation the tools and blank are withdrawn relatively to each other and the blank indexed. The provision of two cam ways permits of both roughing and finishing on the same machine and the mechanism described enables the machine to be changed over readily and conveniently from roughing to finishing.

The cam lever 134 is connected with an arm 145 by means of a block 146 which is adjustable in a slot in the lever 134 and which is swivelly connected with a block 147 which is movable in a slot formed in the arm 145. The position of the block 146 and with it the block 147 can be adjusted by means of the screw 148, in the usual manner, to vary the throw of the cam lever and thus vary the distance which the blank support is withdrawn. The arm 145 is connected to the support 14 by means of the bolts 148 and 149 and the gib 150. The arm 145 is provided with a T-slot and the gib 150 co-operates with the overhanging sides defining this slot, as seen more particularly in Fig. 4, to clamp the arm 145 securely to the support 14. If desired, the bolt 149 can be threaded into the gib just enough to bring it close to its clamping position and the clamping can be effected entirely by adjustment of the bolt 148. In this way it is possible to connect or disconnect the arm 145 from the support 14 simply by movement of the bolt 148.

The cam lever 134 and the arm 145 are preferably so designed that the slots in these two members are in alignment or parallel when the blank is in the innermost or finish cutting position. This construction permits of adjusting the throw of the cam lever 134 by an easily determined adjustment of the block 146 in its slot and requires no intricate calculation of the amount of adjustment required. This construction has the further advantage of enabling a positive stop to be employed for limiting the inward movement of the blank support. The lever arm 134 is always in the same position when the blank support is in full depth finish cutting position, regardless of the amount of throw of the lever arm and the blank support always returns to the same position for finish cutting.

Figure 21:
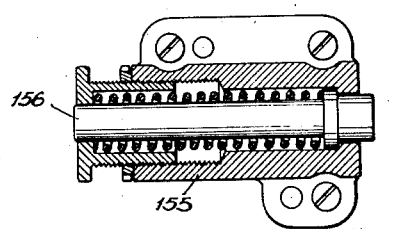
Fig. 21 is a detail showing the positive stop.

Any suitable form of positive stop may be employed. That shown, (Figs. 2 and 21) consists of a cylinder 155 which is secured to the frame 10 of the machine. Within the cylinder 155 is housed, a spring pressed plunger 156. The present machine is designed to take two finishing cuts, one on the down roll of the cradle and the other on the up roll. For this purpose, the finishing cam way 133 is so designed that on the up roll the blank support is fed into the tool deeper than on the down roll. The cycle of operation for the finishing operation is as follows: The tool and blank roll together during the down roll of the cradle; when the down roll is completed, the blank is set further in; the tool and blank roll together on the up roll; toward the end of the up roll, the blank is withdrawn and indexed; the blank is then returned to position to re-commence the cycle. The plunger 156 serves as a resilient means for limiting the inward movement of the blank support on the down roll, while the end of the cylinder 155 serves as a positive stop for limiting this inward movement on the up roll. The provision of a positive stop on the machine is a further assurance that the gears will be cut accurately with all teeth cut to the same depth and with all gears cut alike.

Figure 22:
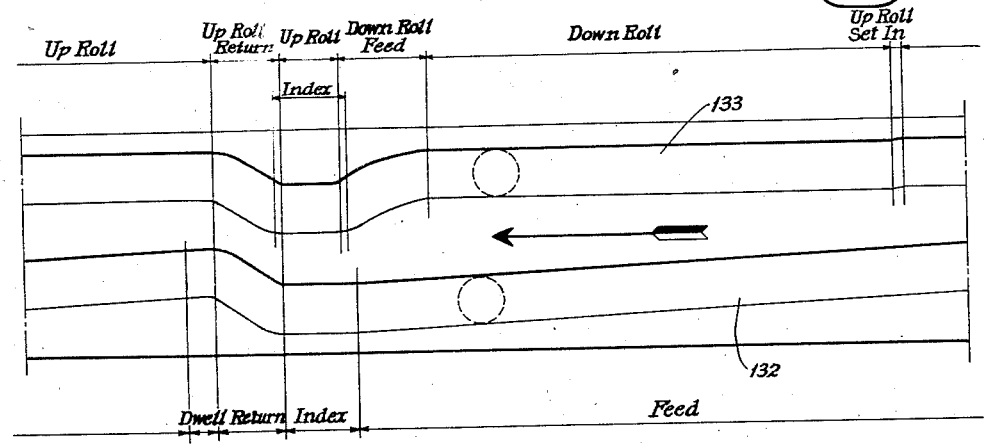
Fig. 22 is a layout of the roughing and finishing cam ways of the feed cam.

A layout of the roughing and finishing cam ways 132 and 133 is shown in Fig. 22. For roughing, no motion need be imparted to the cradle. One or both of the change gears 75, 76 and one or all of the change gears 81, 82, 85 and 86 may be removed from the machine and the shafts 80 and 87 connected together by a strap so that no motion will be imparted to the cradle and no motion, except the indexing motion, to the blank.

When the blank has been completely cut, it is necessary to move the blank support 14, which has already been moved clear of the tools by the cam 131, completely away from the tools so as to take the now finished gear off the blank spindle. For this purpose, means is provided for backing the blank support 14 further away from the tools in the direction perpendicular to the plane of operation of the tools. This movement of both blank head carrier and support away from the tools in the direction described makes it possible to remove or chuck a blank more readily than in previous constructions. For moving the blank support or slide away from the tools, a pinion 160 is employed. This pinion is secured to a shaft 161 (Figs. 1 and 2) and meshes with a rack 162 which is secured to the blank support or slide 14. The shaft 161 is journaled in the frame or bed 10 of the machine and is rotated through a reduction, consisting of a pinion 163 rotatable by means of the handwheel 164, and the internal gear 165 which is formed on or secured to the plate 166 which is fastened to the shaft 161. By rotating the handwheel 164, the blank support 14 can be moved any desired distance away from the tool.

Figure 23:
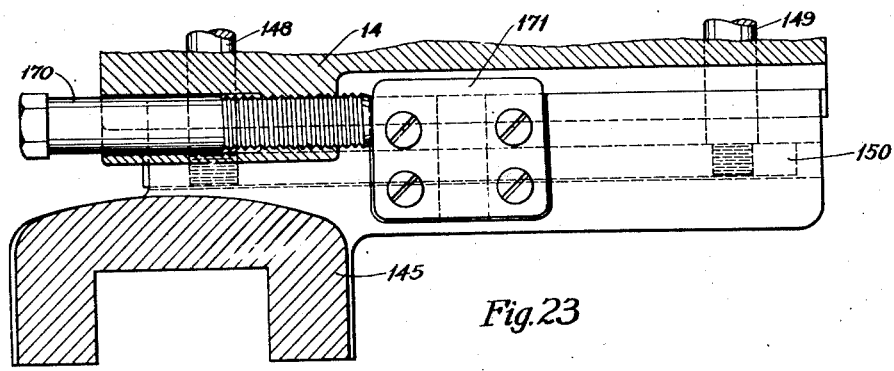
Fig. 23 is a detail showing the connection between the blank support or slide and the arm controlling its movement.

In order to move the blank away from the tool, as described, the tool support 14 must be disconnected from the arm 145. This is readily done by loosening up on the bolt 148. The lever arm 145 has been set so as to give the proper movement to the blank support 14 for feeding and indexing. Means should be provided, therefore, to insure that after a finished gear has been taken off the machine and a new blank placed thereon, that the blank support and arm will be connected together in the proper predetermined position. For this purpose, a screw 170 is provided on the blank support 14 (Figs. 2, 4, and 23) which is adapted to cooperate with a block 171 secured to the arm 145. After the proper relative positions of the arm 145 and the blank support 14 have been initially determined, the screw 170 is threaded up against the block 171 and locked in position by the set screw 172. The screw 170 and block 171, hence, serve as indicia whereby once the blank support 14 has been disconnected from the arm 145, it may be always connected with the arm in the proper position again. The screw 170 serves, also, to hold the blocks 146 and 147 against one side of the slots in the lever 134 and arm 145, respectively, and to hold whichever follower 137 or 138 is in engagement with the cam 131, against one side of this cam way, thus exerting tension on all these parts and cooperating with the positive stop to hold the parts rigidly during the up roll or final finishing operation of the machine.

The cam 131 which controls the movement of the blank support or slide 14 is driven from the back shaft 68 in the manner now to be described. The cam 131 is secured to a worm wheel 175 (Fig. 5) which is journaled on a suitable bearing provided in the frame of the machine. The worm wheel 175 is driven by a worm 176 which is mounted on a shaft 177 (Fig. 2) driven from the shaft 178 by the bevel gears 179 and 180. The shaft 178 is connected with the back shaft 68 by the clutch 181. This clutch permits of timing the feed cam 131 with the trip cam 198, referred to hereinafter. The shaft 68 always rotates in the same direction, so that the cam 131 always rotates in the same direction.

After a tooth or tooth space has been completely cut, the blank is indexed. The indexing mechanism operates on the same general principle as that disclosed in the copending application of Ernest C. Head, Serial No. 113,532, filed June 3, 1926. In the present machine, however, the parts controlling the indexing operation are arranged with the reversing mechanism and the parts controlling the primary operations of the machine in a detachable unit, so constructed that these parts may be timed together apart from the machine and then secured in position.

During the cutting operation, the housing 185 for the differential gears 89 is stationary. It is locked against movement by a pair of stop levers 186 and 187 (Figs. 3, 6 and 7) which cooperate with stop plates 188 and 189 secured to the differential housing 185. These stop levers 186 and 187 are pivotally mounted on the stud 190 mounted on the bracket 65. One of the stop levers, as the lever 187, is formed with a projection 191 which engages the tail of a pawl 192 which is pivotally mounted on the differential housing 185 between the stop plates 188 and 189. When the stop levers 186 and 187 are moved out of locking position the pawl 192 is also released. As soon as the pawl 192 is released, it is forced by the spring 193 into engagement with the ratchet wheel 194. The ratchet wheel 194 is journaled on the shaft 87 and is continuously rotated by means of the gears 195 and 196, one of which 196 is secured to the sleeve of the ratchet wheel and the other of which 195 rotates with the gear 74. When, therefore, the pawl 192 engages the ratchet wheel 194, the motion of the ratchet wheel 194 is transmitted to the differential housing 185, thus imparting an added algebraic motion to the train of gears which rotate the blank spindle. This added motion serves to index the blank. The indexing operation takes place preferably, during an integral number of rotations of the differential housing, so that the differential housing is always locked up in the same place and any errors which may occur in the train of gears driving the blank are distributed equally on all of the teeth and so have no effect on the spacing.

Figure 3:
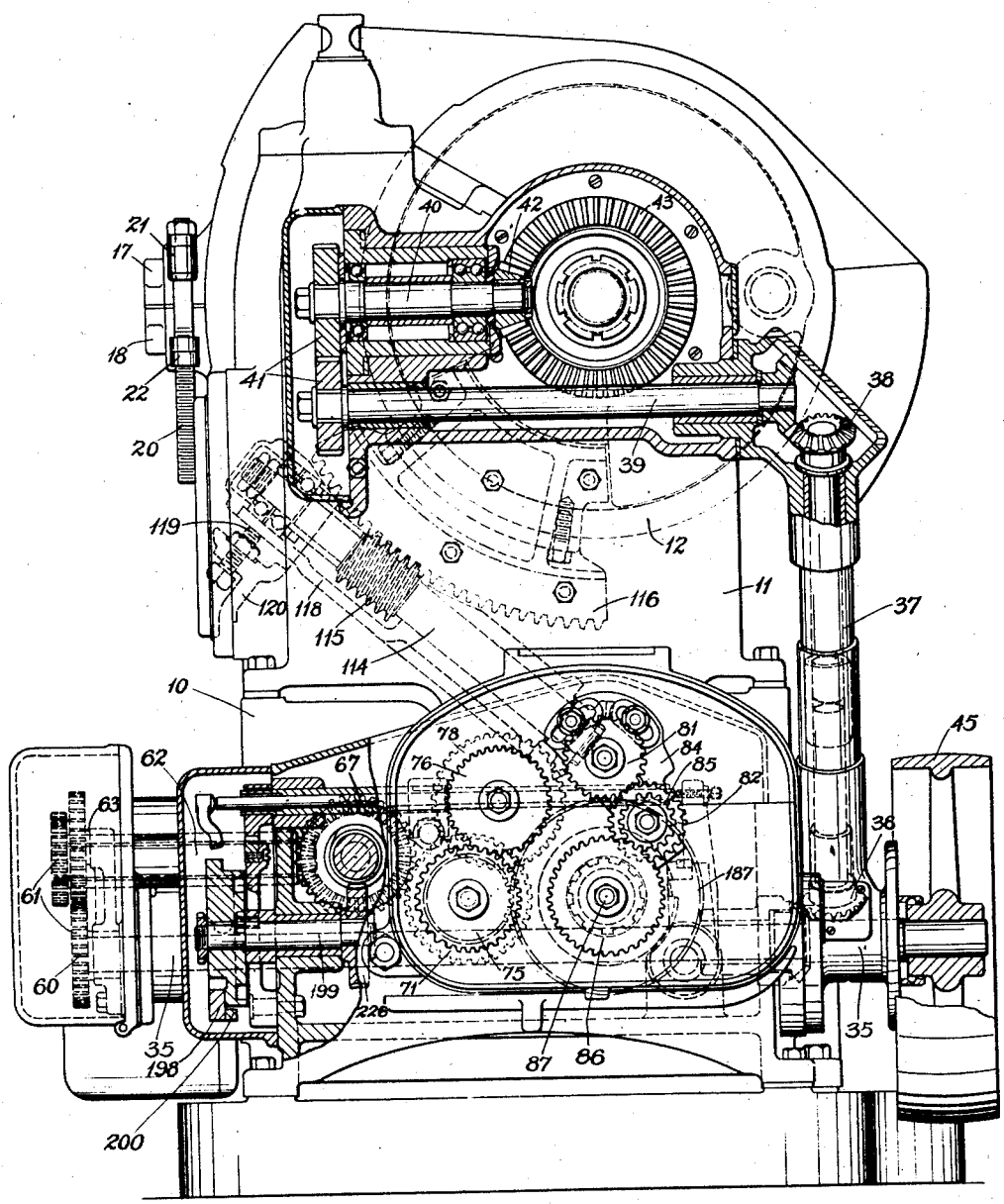
Fig. 3 is an end elevation of the machine, parts being broken away.
Figure 7:
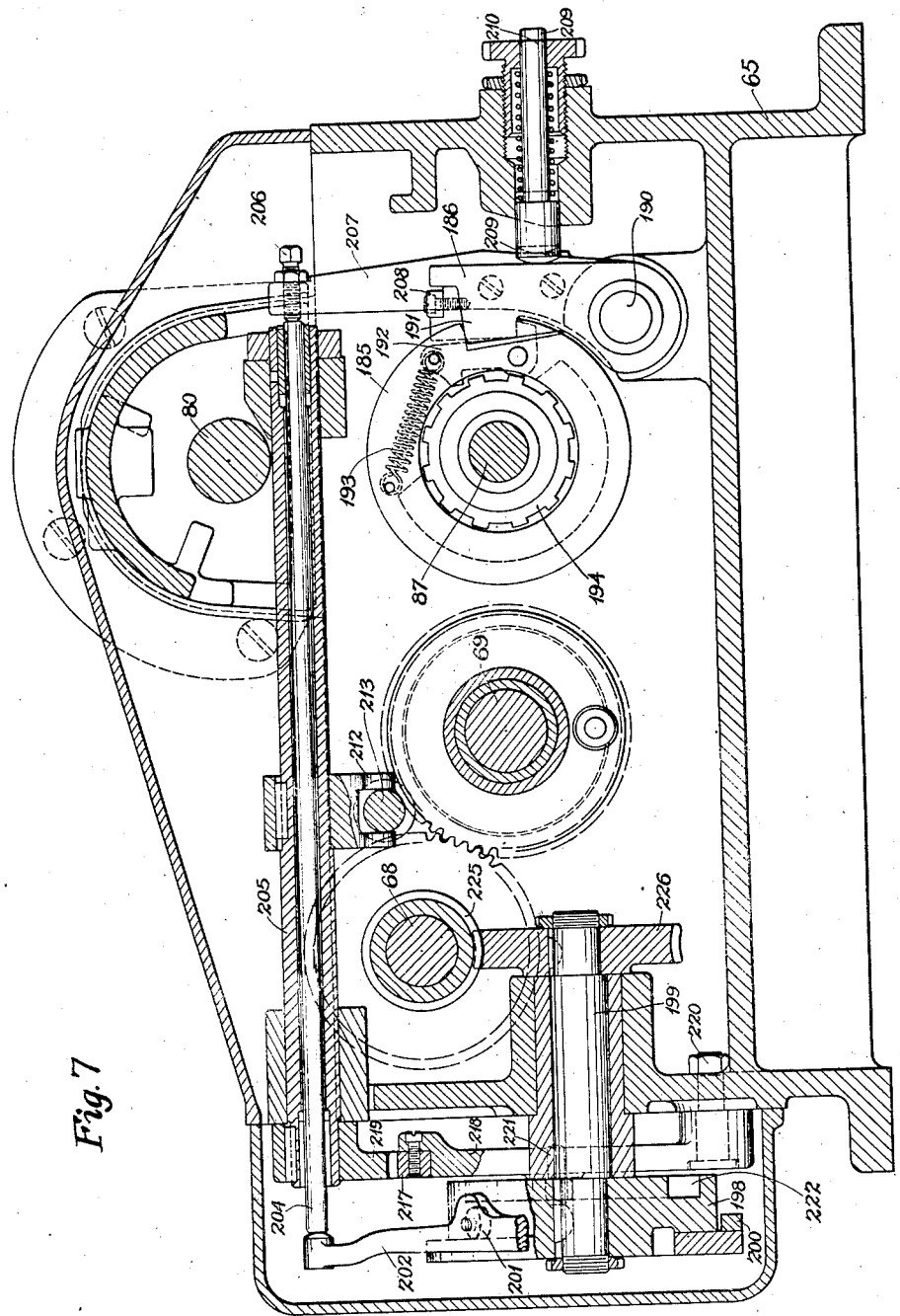
Fig. 7 is a sectional view on the line 7—7 of Fig. 2.

The stop levers 186 and 187 are tripped by means of the cam 198 which is keyed to a shaft 199 which is journaled in a suitable bearing in the bracket 65. The cam 198 is provided with a cam surface 200 which cooperates with a roller 201, secured to the lever 202, to rock the lever 202 about its pivot 203 (Figs. 3, 7 and 8). The lever 202 is pivoted at 203 on the bracket 65. The free end of this lever 202 contacts with a rod 204 which slides in an oscillatable sleeve 205. The end of the rod 204 remote from the lever 202 contacts with a set screw 206 carried by the lever arm 207 which is pivotally mounted on the stud 190. This lever arm 207 is connected with one of the stop levers 187, so that when the lever 207 is rocked by the rod 204, the stop lever 187 is withdrawn from the stop plate 189. This lever 187 is connected by a lug 208 with the stop lever 186, so that both stop levers are withdrawn from the stop plates 188 and 189 simultaneously. The stop levers 186 and 187 are returned to locking position, after the indexing operation has been completed, by the spring pressed plungers 209 and 210 which are housed in the bracket 65.

Figure 24:
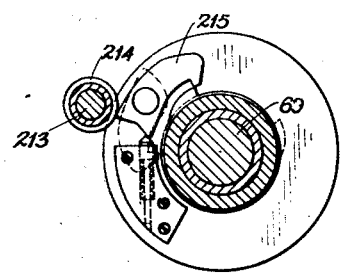
Fig. 24 is a detail of the reversing mechanism.

The oscillatable sleeve 205, which is suitably journaled in bearings in the bracket 65, carries a yoke 212, which serves, on oscillation of the sleeve 205 to reciprocate the rod 213 (Figs. 6 and 7). This rod 213 governs the direction of rotation of the reversible shaft 69, being provided with rollers 214 which control the clutches 215 of the reversing mechanism (Fig. 24, see also Figs. 16 and 17 of Patent No. 1,203,608). The sleeve 205 is oscillated by the segmental gear 217 which is secured to the pivoted lever arm 218 and which meshes with a segmental gear 219 keyed to the sleeve 205. The lever arm 218 is pivoted at 220 on the bracket 65 and carries a roller 221 which engages in a cam slot 222 (Figs. 7 and 8) formed in the cam 198. Rotation of the cam 198, consequently, causes the rod 204 to be reciprocated and the sleeve 205 to be oscillated. In this way, the cam 198 governs the reversal of the reversible shaft 69 and the tripping of the index stop levers 186 and 187.

The cam shaft 199 carrying the cam 198 is rotated continuously in the same direction from the shaft 68 by means of a worm 225 which is carried by said shaft 68 and which meshes with a worm wheel 226 keyed to the shaft 199.

One of the principal features of the present improvement is the arrangement of the means governing the primary operations of the machine in a detachable unit which can be removed from the machine so that the elements thereof can be properly and conveniently synchronized. The bracket 65 is detachably secured to the machine frame and this bracket carries the back shaft 68, the reversible shaft 69, the differential housing and gears 185 and 89, the means for locking the differential housing against rotation during cutting including the stop levers 186 and 187, the means for imparting continuous rotation to the ratchet wheel 194 including the gears 195 and 196, and the means for tripping the stop levers 186 and 187 and for governing the direction of rotation of the reversible shaft 69 including the cam 198, the rod 204 and the oscillatory sleeve 205. These various elements control the movement of the blank support, the movement of the cradle, the rotation of the blank and the indexing of the latter. They are arranged in the bracket 65 in a compact manner, and can be all timed up together, to insure proper operation of the machine, on the work bench. The difficult operation of timing the various control elements after the whole machine is assembled is no longer necessary. The arrangement of the control elements in a detachable unit makes for increased accuracy and at the same time reduces the cost of assembling the machine and its overhauling.

The means for clapping the tools and for holding the tools rigidly during the cutting operation will be described next.

Each of the tool slides 13 (Fig. 12) carries a tool block 230. The tool blocks 230 are secured adjustably to the slide 13 by means of bolts 231 and T-bars 232, the T-bars 232 being drawn up against T-slots or grooves 233 provided on the slides 13, by the bolts 231 to clamp the blocks 230 in any position of adjustment. The adjustability of the tool blocks 230 permit of cutting blanks of different cone distances. Each of the tool blocks 230 carries a clapper block 235 which is mounted to swing about an axis 236 to carry the tool T to and from cutting position. The tool T is secured to the plate 237 by means of bolts 238 and is adjustable on the clapper block by means of the screw 239 which engages in a threaded opening in the plate 237. The tool is held in any adjusted position on the clapper block by means of the binder plates 240 and 241 and the retaining screws 242.

As the slides 13 travel back and forth under actuation of the actuating plate 28, the tools alternately cut. When the direction of the tool slides are reversed at either end of their reciprocating movement, the clapper blocks 235 are swung about their pivots 236 to move the tools from or into cutting position. The swinging movement of the clapper blocks 235 is accomplished by a connecting device comprising in each case a bar 245 (Figs. 12, 14 and 16) which is secured to the tool arm 17, a friction box 246 which is carried by the tool block 230, and which travels on the bar 245, the connecting rod 247 secured to the friction box 246 by the pin 248, and the toggle member 249 which has a universal connection with both the rod 247 and the clapper block 245. When the slide 13 reverses at the end of its movement in one direction, the tension exerted on the friction box 246 rocks the clapper block 235 about its pivot, thus moving the tool to and from cutting position.

The friction on the bar 245 is exerted by means of springs 253 (Fig. 16) which press against the upper of two plates 254 which are lined with a suitable friction material 255. The keeper 251, above referred to, may be made in a single piece or may consist of separate blocks as shown.

One improvement of the present invention consists in the means for holding the clapper block rigidly against movement when the tool is cutting. The clapper block 235 is made wedge-shaped at its free end, as indicated at 250, and this wedge-shaped portion of the clapper block is adapted to be engaged in a wedge or V-shaped keeper 251 secured to the tool block 230, when the clapper block is in cutting position. The cooperating surfaces of wedge shaped portion 250 and the keeper 251 hold the clapper block and the tool rigidly against up and down movement, as well as forward movement during the cut, thereby entirely eliminating chatter.

In the present machine, it is the intention to adjust the tools and other parts into their correct cutting positions by employing any usual or suitable means for this purpose. The present machine includes, however, as a permanent attachment, an improved form of stock dividing apparatus, which will enable any one of a group of roughed blanks, from which it is desired to cut gears of identical dimensions, to be quickly adjusted initially into the same position as the first of the group occupied when it is set up for cutting, so that the gearing controlling the relative movement of tools and blank will be in the same position always at the beginning of operation upon each blank of a group and will therefore be arranged so as to cause all of the blanks to be cut identically. This improvement provides an accurate check for the blank setting and enables the blank to be set up quckly and with complete accuracy.

Mounted on the blank spindle 16 for rotatable adjustment thereon is an arm 260 (Figs. 17 and 18), to which is hinged a second arm 261, on which is adjustably mounted a plate 262. Pivotally mounted on the plate 262 is an indicator finger 263, one end of which is adapted to be engaged in a tooth space of the roughed blank and the other end of which is provided with an index mark readable against an index mark on the adjacent surface of the plate 262. Mounted on a ring 264 surrounding the blank spindle 16 and rigidly connected to said blank spindle by a set screw 265, is a ring 266. The two rings 264 and 266 are connected together by suitable friction clamping means, such as springs 267 and friction rings 268. The ring 266 carries a lug 269 which is adapted to engage a lug 270 on the blank head 15, as the blank spindle rotates in its bearings in the head 15. The lug 269 on the ring 266 is adapted to strike the lug 270 on the head just as the blank is to be indexed and the two lugs hold the ring 266 from partaking of the indexing movement of the blank spindle. Consequently the ring 266 always retains the same position relative to the tools no matter how many teeth are cut on the blank. Mounted for adjustment on the arm 260 is a plate 272 on which is pivotally mounted the member 273 carrying the finger 274 which is adapted to be engaged in a notch 275 formed in the ring 266.

When a group of equally dimensioned gears are to be cut, one of the previously roughed blanks is secured to the spindle 16 and the blank positioned by the tools. The machine is then run through one cycle of its operation. The finger 263 is then engaged with a tooth space of the blank and the arm 260 swung about the spindle until the index marks on the indicator finger 263 and the plate 262 are in alignment. The arm 260 is clamped in this position to the bracket 277 which extends from and is integral with the blank head 15, by means of the bolts 278. The plate 272 is then adjusted on the arm 260 until the finger 274 engages the notch 275 in the ring 266. In this position the plate 272 is bolted to the arm 260. When this has been accomplished, the blank has been, as it were, zeroized with reference to a relatively stationary part, namely, the ring 266. The arm 261 can now be swung upward and out of the way and the finger 274 disengaged from the notch 275. The spring pressed plunger 280 housed in the plate 272 serves to retain the member 273 with the finger 274 in disengaged position.

The blank is now ready for the finishing cut. As the cutting operation proceeds, the blank spindle rotates in its bearings in the head 15 and carries with it the rings 264 and 266. When the blank has rolled clear of the tool, the blank support 14, is withdrawn and the blank indexed through the release of the differential housing, as already described. Just as the indexing operation is about to commence, the lug 269 on the ring 266 will strike the lug 270 on the head 15, thus holding the ring 266 stationary relative to the blank spindle during the indexing operation. In this way the ring 266 retains, throughout the entire cutting operation on the blank, the same position relative to tools that it had when the blank was initially set. The ring 266 constitutes, therefore, a means of reference for properly setting a new blank.

After the first blank has been finished, it is taken off the machine and a new blank secured to the spindle. The arm 260 is unclamped and the member 273 is then swung down about its pivot 279 to engage the finger 274 in the notch 275 of the ring 266. In this position, the arm 260 is clamped. The arm 261 is swung down about its pivot so that the indicator finger 263 is engaged in a tooth space of the roughed blank. If now, the index marks on the indicator finger 263 and the plate 262 do not register, the blank spindle 16 is rotated by hand until these marks align. When they are in alignment, the new blank has the same position relative to the tools as the first blank had. This improved form of stock dividing apparatus, hence, permits of setting blanks readily into the same position that a previous blank had when it was set up, a very important factor making for rapidity of production and accuracy.

The plate 262, as previously described is adjustable on the arm 261 and can be held in any position of adjustment by means of the bolt 280 which engages in the slot 281 formed in the arm. This adjustment is required for positioning gears of different cone distances.

The cutting and lubricating oil pumps on the present machine may be driven in any suitable manner. Provision has been made in the embodiment shown, for driving these pumps from the pulley shaft 35 by means of the bevel gears 285, (Fig. 2).

In the embodiment shown, means is provided for automatically stopping the operation of the machine after the desired number of operations have been completed upon the blanks. This means comprises a cam plate 290 (Fig. 4) which is secured to the cam 131 and which cooperates with a bell crank lever 291 which is pivotally mounted on a bracket secured to the bed 10, to reciprocate a rod 292 which actuates the automatic stop mechanism, shown generally at 293, (Fig. 1). The automatic stop device may be of any suitable construction, but, preferably, is of the form described in the U. S. patent to Hill, No. 1,577,121, March 16, 1926. This stop mechanism may operate either an electrical switch for stopping the motor which operates the machine, or a countershaft control lever.

While the present invention has been described particularly with reference to machines employing reciprocating tools, it will be understood that certain features of the present invention are applicable, also, to the production of gears by means of other types of tools. While described also particularly with reference to the production of gears having straight teeth, it will be understood that the present invention is applicable in certain aspects to the production of gears having curved teeth. While the present invention has been described in connection with a machine for producing bevel gears, it will be understood that the invention may be employed, in certain aspects, in the production of other types of gears as hypoids, spurs, etc.

In general, it may be said, that while we have described a preferred embodiment of our invention, the invention is capable of further modification within its limits and the scope of the appended claims, and that this application is intended to cover any variations, uses, or adaptations of the invention following, in general, the principles of the invention and including such departures from the present disclosure as come within known or customary practice in the gear art and may be applied to the essential features hereinbefore set forth and as fall within the scope of the appended claims.

Having thus described our invention, what we claim is:

1. In a gear generating machine, a tool support, a tool mechanism mounted thereon, a blank support, a blank head mounted for angular adjustment on said blank support, an oscillatory carrier upon which one of said supports is mounted, and means for moving the blank support, for feeding and indexing, in a direction parallel to the axis about which said carrier oscillates.

2. In a gear generating machine, a tool support, tool mechanism mounted thereon, a blank support, a blank head mounted for angular adjustment on said blank support, an oscillatory carrier upon which one of said supports is mounted, and means for moving said blank support, for feeding and indexing, in a direction perpendicular to the plane in which the tool mechanism operates.

3. In a gear generating machine, a tool support, tool mechanism mounted thereon, a blank support, a blank head mounted for angular adjustment on said blank support, an oscillatory carrier upon which one of said supports is mounted, and means for moving said blank support, for feeding and indexing, in a direction parallel to the axis about which said carrier oscillates, said means including a cam shaft and a cam mounted thereon.

4. In a gear generating machine, a tool support, tool mechanism mounted thereon, a blank support, a blank head mounted for angular adjustment on said blank support, an oscillatory carrier upon which one of said supports is mounted, and means for moving said blank support, for feeding and indexing, in a direction perpendicular to the plane in which the tool mechanism operates, said means including a cam shaft and a cam mounted thereon.

5. In a gear generating machine, tool mechanism, an oscillatory carrier upon which said tool mechanism is mounted, a blank support movable, for feeding and indexing, toward and from the tool mechanism in a direction parallel to the axis of said oscillatory carrier, and means for automatically imparting said movement to the blank support.

6. In a gear generating machine, tool mechanism, an oscillatory carrier upon which said tool mechanism is mounted, a blank support movable, for feeding and indexing, toward and from the tool mechanism in a direction parallel to the axis of said oscillatory carrier, and a cam shaft and a cam mounted thereon for governing said movement.

7. In a machine for producing gears, tool mechanism, a blank support, a blank head angularly adjustable on said blank support for bringing the blank into proper cutting relation with reference to the tool mechanism, and means for moving said blank support, for feeding and indexing, in a direction perpendicular to the plane in which the tool mechanism operates.

8. In a machine for producing gears, tool mechanism, a blank support, a blank head angularly adjustable on said blank support for bringing the blank into proper cutting relation with reference to said tool mechanism, and means for moving said blank support, for feeding and indexing, in a direction perpendicular to the plane in which the tool mechanism operates, such means including a cam shaft and a cam mounted thereon.

9. In a gear generating machine, tool mechanism, an oscillatory carrier upon which the tool mechanism is mounted, a blank support, a blank head angularly adjustable upon said blank support for bringing the blank into proper cutting relation with reference to the tool mechanism, and means for moving the blank support, for feeding and indexing, in a direction perpendicular to the plane in which said tool mechanism operates, such means including a cam shaft and a cam mounted thereon.

10. In a gear generating machine, tool mechanism, an oscillatory carrier upon which the tool mechanism is mounted, a blank support, a blank head angularly adjustable upon said blank support for bringing the blank into proper cutting relation with reference to the tool mechanism, and means for moving said blank support, for feeding and indexing, in a direction perpendicular to the plane in which the tool mechanism operates.

11. In a gear generating machine, tool mechanism, an oscillatory carrier upon which the tool mechanism is mounted, a blank support, a blank head angularly adjustable on said blank support for bringing the blank into the proper cutting plane with reference to the tool mechanism, means for moving the blank support, for feeding and indexing, in a direction perpendicular to the plane in which the tool mechanism operates, such means including a cam shaft and a cam mounted thereon, said cam having two separate cam ways, one of which is used for a roughing operation and the other for a finishing operation, and means for operatively connecting said blank support selectively with either of said ways.

12. In a gear generating machine, tool mechanism, an oscillatory carrier upon which the tool mechanism is mounted, a blank support, a blank head angularly adjustable upon said blank support for bringing the blank into the proper cutting plane with reference to the tool mechanism, means for moving the blank support, for feeding and indexing, in a direction parallel to the axis of said carrier, such means including a cam shaft and a cam mounted thereon, said cam having two separate cam ways, one of which is used for a roughing operation and the other for a finishing operation, and means for operatively connecting said blank support selectively with either of said cam ways.

13. In a machine for producing gears, a blank support, a reciprocating tool block, a clapper block pivotally mounted on said tool block, a tool secured to said clapper block, means for swinging said clapper block about its pivot to move the tool to and from cutting position, means for holding the clapper block against forward and back movement when in cutting position, and cooperating means on said tool block and clapper block for holding the clapper block rigidly against up and down movement when in cutting position.

14. In a machine for producing gears, a blank support, a reciprocatory tool block, a clapper block movably mounted on said tool block and provided with a wedge-shaped portion, a tool secured to said clapper block, means for moving said clapper block to move the tool to and from cutting position, and a V-shaped keeper secured to said tool block in which the wedge-shaped portion of the clapper block is adapted to seat, when in cutting position, whereby up and down movement of the tool during the cutting operation is prevented.

15. In a machine for producing gears, a blank support, a reciprocating tool block, a clapper block movably mounted on the tool block, a tool secured to said clapper block, a keeper secured to said tool block and means for moving the clapper block to and from cutting position, said clapper block and keeper having cooperating surfaces which are inclined to the line of travel of the clapper block and serve to hold the clapper block rigidly against up and down movement during the cutting operation and means for holding the clapper block against forward and back movement during said operation.

16. In a machine for producing gears, a blank support, a reciprocating tool block, a clapper block pivotally mounted on said tool block and provided with a wedge-shaped portion, the sides of which are inclined to the path of travel of said clapper block, a tool secured to said clapper block, a cooperating V-shaped keeper secured to said tool block, and means for swinging said clapper block about its pivot, comprising a bar fixedly secured to a relatively stationary part of the machine, a friction clamp secured to said tool block and slidable on said bar, and means connecting said friction clamp with said clapper block.

17. In a machine for producing gears, a blank support, a reciprocating tool block, a clapper block pivotally mounted on the tool block, a tool secured to said clapper block, a keeper secured to said tool block, said clapper block and keeper having cooperating surfaces which are inclined to the line of travel of the clapper block and serve to hold the clapper block rigidly against up and down movement during the cutting operation, means for swinging the clapper block about its pivot, comprising a bar fixedly secured to a relatively stationary part of the machine, a friction clamp secured to said tool block and slidable on said bar, a rod connected to said friction clamp and a toggle member connecting said rod and clapper block, and means for limiting the forward movement of the clapper block.

18. In a machine for producing gears, the combination with a blank support and a tool support, one of which is movable toward and from the other for feeding and indexing, of a cam shaft and a cam thereon governing said movements, said cam having two separate cam ways, one of which is used for a roughing operation and the other for a finishing operation, a pair of followers, one of which is engageable with each of said cam ways, and means for simultaneously moving said followers in opposite directions to engage one with one cam way and disengage the other from the other cam way.

19. In a machine for producing gears, the combination with a blank support and a tool support, one of which is movable toward and from the other for feeding and indexing, of a cam shaft and a cam thereon governing said movement, said cam having two separate cam ways, a pair of followers, one of which is engageable with each of said cam ways, a rack connected to each of said followers, a pinion disposed between and meshing with both of said racks, said pinion being rotatable to move said followers in opposite directions to engage one with a cam way and disengage the other from the other cam way.

20. In a machine for producing gears, a frame, a tool mechanism, a blank support movable on said frame, for feeding and indexing, in a direction perpendicular to the plane of operation of said tool mechanism, a blank head angularly adjustable on said blank support to bring the blank into proper cutting relation with reference to the tool mechanism, and means for imparting movement to said blank support, comprising a cam shaft, a cam mounted thereon, said cam having two separate cam ways, a pair of followers, one of which is engageable with each of said cam ways, operatively connecting said cam and blank support, and means for simultaneously moving said followers in opposite directions to engage one of said followers with a cam way and disengage the other from the other cam way.

21. In a machine for generating gears, a frame, a blank support, a tool support, a carrier, upon which one of said supports is mounted, oscillatably mounted in said frame, said frame being provided with a V-shaped guide-way concentric with the bearing for said carrier, a V-shaped projection formed on said carrier concentric with its bearing, one face of which is adapted to cooperate with one face of said guide way, and an arcuate gib, having its inner face inclined to the cradle axis, secured to the other face of the V-shaped projection and cooperating with the other face of the V-shaped guide way to retain the carrier in position on the frame during oscillation thereof.

22. In a machine for generating gears, the combination with a blank support, a tool support, and an oscillatory carrier upon which one of said supports is mounted, of a control unit, comprising a drive shaft, a reversible shaft operatively connected with said drive shaft and operatively connectable with said carrier, a differential operatively connectable with said reversible shaft and with the blank, means for locking one element of the differential against movement during cutting, means governing the direction of rotation of the reversible shaft, means controlling said locking means, and a bracket upon which the element of said unit are mounted, said bracket being detachably connected to the frame of said machine whereby the elements of said unit may be synchronized apart from said machine.

23. In a machine for generating gears, the combination with a blank support, a tool support, and an oscillatory carrier upon which one of said supports is mounted, of a control unit, comprising a drive shaft, a reversible shaft operatively connected with said drive shaft and operatively connectable with said carrier, a differential operatively connectable with said reversible shaft and with the blank, means for locking one element of the differential against movement during cutting, a cam shaft operatively connected with said drive shaft, a pair of cams mounted thereon, means controlled by one of said cams governing the direction of rotation of the reversible shaft, means controlled by the other cam for tripping said locking means, and a bracket upon which said elements are mounted, said bracket being detachably connected to the frame of the machine whereby the elements of said unit may be synchronized apart from said machine.

24. In a machine for generating gears, the combination with a blank support, a tool support, and an oscillatory carrier upon which one of said supports is mounted, of a control unit, comprising a drive shaft, a reversible shaft operatively connected with said drive shaft and operatively connectable with said carrier, a differential operatively connectable with said reversible shaft and with the blank, means for locking one element of said differential against movement during cutting, an oscillatable sleeve, controlling the direction of rotation of the reversible shaft, a rod slidable in said sleeve for controlling the movement of said locking member, a cam shaft operatively connected with the drive shaft, a pair of cams mounted thereon for governing, respectively, the oscillation of said sleeve and the reciprocation of said rod, and a bracket upon which the elements of said unit are mounted, said bracket being detachably connected to the frame of said machine whereby the elements of said unit may be synchronized apart from said machine.

25. In a machine for producing gears, a frame, tool mechanism, a blank support, a blank head angularly adjustable on said blank support to bring the blank into proper cutting relation with reference to the tool mechanism, means for moving said blank support relatively to the tool mechanism for feeding and indexing, said means comprising a cam shaft, a cam mounted thereon, a cam lever pivotally mounted on the frame of the machine and operatively connected with said cam, a block adjustable in a slot in said cam lever, and a block slidable in a slot in said blank support and swivelly connected with the first block, said cam lever and support being so disposed relatively to each other that when the blank is in cutting position, the slots on said support and cam lever are parallel.

26. In a machine for producing gears, a frame, tool mechanism, a blank support movable on said frame, for feeding and indexing, in a direction perpendicular to the plane of operation of said tool mechanism, a blank head angularly adjustable on said blank support to bring the blank into proper cutting relation with reference to the tool mechanism, and means for imparting movement to said blank support, comprising a cam shaft, a cam mounted thereon, a cam lever pivotally mounted on the frame of the machine and operatively connected with said cam, a block adjustable in a slot in said cam lever, and a block slidable in a slot in said blank support and swivelly connected with the first block, said cam lever and blank support being so disposed relatively to each other that when the blank is in cutting position the slots in said blank support and cam lever are parallel.

27. In a machine for generating gears, a blank support, a blank spindle journaled therein, a tool support, tool mechanism mounted thereon, an oscillatable carrier upon which one said supports is mounted, a reversible shaft, gearing operatively connecting said reversible shaft with said carrier, gearing operatively connecting said reversible shaft with said blank spindle for rotating the same including a differential, a locking member for holding one element of the differential against movement during the cutting operation, an oscillatable sleeve controlling the direction of rotation of the reversible shaft, a rod slidable in said sleeve for controlling the movement of said locking member, a cam shaft and a pair of cams mounted thereon for governing respectively the oscillation of said sleeve and the reciprocation of said rod.

28. In a machine for generating gears, a blank support, a blank spindle journaled thereon, a tool support, tool mechanism mounted thereon, an oscillatable carrier upon which one of said supports is mounted, a reversible shaft, gearing operatively connecting said reversible shaft with said carrier, gearing operatively connecting said reversible shaft with said blank spindle including a differential, a locking member for holding one element of said differential against movement during the cutting operation, a pivotally mounted segmental arm, an oscillatable sleeve, having a gear connecting with said segmental arm, for controlling the direction of rotation of said reversible shaft, a rod slidable in said sleeve for tripping said locking member, an arm mounted for pivotal movement in a direction at right angles to the first arm adapted to move said rod in said sleeve, a cam shaft, and a pair of cams mounted thereon for governing the movement of said arms.

29. In a machine for producing gears, the combination with tool mechanism, a blank head, a blank spindle journaled in said head, and means for imparting an indexing rotation to said blank spindle, of a stock dividing apparatus comprising a member adapted to be held stationary relative to the blank spindle, an arm adjustable on the blank spindle, cooperating means on said arm and member for locating said arm relative to said member, means for securing said arm to the head in any position of its adjustment, a second arm movably mounted on the first, means carried by said second arm adapted to engage a tooth space of the blank, and indicating means for determining when said last named means, and through the same, when the blank is in proper position.

30. In a machine for producing gears, the combination with tool mechanism, a blank head, a blank spindle journaled in said head, and means for imparting an indexing rotation to said blank spindle, of a stock dividing apparatus, comprising a member adapted to be held stationary relative to the blank spindle, an arm rotatably adjustable on the blank spindle, cooperating means on said arm and member for locating said arm relative to said member, means for securing said arm to the head in any position of its adjustment, an index finger pivotally mounted on said arm adapted to engage a tooth space of the blank and indicating means on said finger and arm for determining when said finger and through the same when said blank is in proper position.

31. In a machine for producing gears, the combination with tool mechanism, a blank head, a blank spindle journaled in said head, and means for imparting an indexing rotation to said blank spindle, of a stock dividing apparatus, comprising a ring connected frictionally to said blank spindle, cooperating stops on said ring and head adapted to hold said ring stationary relative to the spindle during the indexing rotation of the latter, an arm adjustably mounted on the blank spindle, cooperating means on said arm and ring for locating said arm relative to said ring, means for securing said arm to said head after adjustment, a second arm pivotally mounted on the first, and means carried by the second arm adapted to engage a tooth space of the blank and indicating means for determining when said last named means and, through the same, when the blank is in proper position.

32. In a machine for producing gears, the combination with tool mechanism, a blank head, a blank spindle journaled in said head, and means for imparting an indexing rotation to said spindle, of a stock dividing apparatus, comprising a ring connected frictionally to said blank spindle, cooperating stops on said ring and head adapted to hold the ring stationary relative to the spindle during the indexing rotation of the latter, an arm adjustably mounted on the blank spindle, a finger carried by said arm adapted to engage a notch in said ring for locating said arm relative to the blank spindle, means for securing said arm to the head after adjustment, a second arm pivotally mounted on the first and an index finger pivotally mounted on the second arm adapted to engage a tooth space of the blank, and indicating means on said finger and second arm for determining when said finger and, through the same, when said blank is in proper position.

33. In a machine for producing gears, a frame, tool mechanism, a blank support movable on said frame, for feeding and indexing, in a direction perpendicular to the plane of operation of the tool mechanism, a blank head angularly adjustable on said blank support to bring the blank into proper cutting relation with reference to the tool mechanism, means for imparting movement to said blank support, comprising a cam shaft, a cam mounted thereon, a cam lever pivotally mounted on the frame of the machine and operatively connected with said cam, a block adjustable in a slot in said cam lever, and a block slidable in a slot in said blank support and swivelly connected with the first block, said cam lever and blank support being so disposed relatively to each other that when the blank is in cutting position the slots in said blank support and cam lever are aligned, and a positive stop for limiting the inward movement of the blank support relative to the tool mechanism.

34. In a machine for producing gears, a frame, tool mechanism, an oscillatable carrier upon which the tool mechanism is mounted, a blank support movable on said frame, for feeding and indexing, in a direction perpendicular to the plane of operation of the tool mechanism, a blank head angularly adjustable on said blank support to bring the blank into proper position with reference to the tool mechanism, means for imparting an oscillatory movement to said carrier, means for imparting movement to the blank support, comprising the cam shaft and a cam mounted thereon, said cam being so formed that the blank support is fed further in relative to the tool mechanism during the roll of the carrier in one direction than in the other, and a stop interposed between said blank support and tool mechanism comprising a cylinder and a spring pressed plunger housed therein, said plunger acting to limit the inward movement of the blank support relative to the tool mechanism during the roll of the cradle in one direction and the corresponding outer end of said cylinder acting to positively stop the inward movement of the blank support during the roll of the cradle in the other direction.

35. In a machine for producing gears, a frame, tool mechanism, a blank support movable on said frame for feeding and indexing, a blank head angularly adjustable on said blank support to bring the blank into proper cutting relation with reference to the tool mechanism, means for imparting movement to the blank support, comprising a cam shaft, a cam mounted thereon, a cam lever pivotally mounted on the frame of the machine and operatively connected with said cam, a block adjustable in a slot of said cam lever, an arm detachably connected to the blank support, a block adjustable in a slot in said arm and swivelly connected with the first block, said arm and cam lever being so disposed relatively to each other that when the blank support is in proper cutting position the slots in said arm and cam lever are aligned, a stop and an adjustable screw adapted to contact therewith, one of which is carried by the blank support and the other by said arm, and a positive stop for limiting the inward movement of said blank support relative to said tool mechanism.

36. In a machine for producing gears, the combination with a blank support, a tool support, and an oscillatory carrier upon which one of said supports is mounted, of a control unit, comprising a reversible shaft, operatively connected with said carrier, a differential, operatively connectable with said reversible shaft and with the blank and governing the indexing of the blank, means for periodically imparting an added algebraic rotation to the blank through said differential, means controlling said last named means and the direction of rotation of the reversible shaft, and a bracket upon which the elements of said unit are mounted, said bracket being detachably connected to the frame of said machine whereby the elements of said unit may be synchronized apart from said machine.

37. In a machine for producing gears, a tool support, tool mechanism mounted thereon, a blank support, a blank head mounted for angular adjustment on said blank support, a blank spindle journaled therein, an oscillatory carrier upon which one of said supports is mounted, means for moving said blank support, for feeding and indexing, in a direction parallel to the axis about which said carrier oscillates, and separate means for moving said support in the same direction toward and away from the tool mechanism to permit removal of the blank from and chucking of a new blank on the blank spindle.

38. In a machine for producing gears, a tool support, tool mechanism mounted thereon, a blank support, a blank head mounted for angular adjustment on said blank support, a blank spindle journaled therein, means for moving said blank support, for feeding and indexing, in a direction perpendicular to the plane of operation of the tool mechanism, and separate means for moving said support in the same direction toward and away from the tool mechanism to permit removal of the blank from and chucking of a new blank on the blank spindle.

39. In a machine for producing gears, a tool support, tool mechanism mounted thereon, a blank support, a blank head mounted for angular adjustment on said blank support, a blank spindle journaled therein, an oscillatory carrier upon which one of said supports is mounted, means for moving said blank support, for feeding and indexing, in a direction parallel to the axis about which said carrier oscillates, including a cam shaft, a cam mounted thereon, and a lever arm adapted to operatively connect said cam and blank support, said lever arm being detachably connected to said blank support, and separate means for moving said blank support in the direction described toward and away from the tool mechanism, after said lever arm has been disconnected therefrom, to permit removal of the blank from and chucking of a new blank on the blank spindle.

40. In a machine for producing gears, a tool support, tool mechanism mounted thereon, a blank support, a blank head mounted for angular adjustment on said blank support, a blank spindle journaled therein, means for moving said blank support, for feeding and indexing, in a direction perpendicular to the plane of operation of the tool mechanism, including a cam shaft, a cam mounted thereon and a lever arm adapted to operatively connect said cam to the blank support, said lever arm being detachably connected to said blank support and separate means for moving said blank support in the described direction toward and away from the tool mechanism after the lever arm has been disconnected therefrom, to permit removal of the blank from and chucking of a new blank on the blank spindle.

41. In a machine for producing gears, a tool support, tool mechanism mounted thereon, a blank support, a blank head mounted for angular adjustment on said blank support, a blank spindle journaled therein, an oscillatory carrier upon which one of said supports is mounted, means for moving the blank support, for feeding and indexing, in a direction parallel to the axis about which the carrier oscillates including a cam shaft, a cam mounted thereon and a lever arm adapted to operatively connect said cam and blank support, said lever arm being detachably connected to said blank support, a stop and a screw adapted to be adjusted into contact with said stop, one of which is carried by said blank support and the other by said lever arm, and separate means for moving said blank support in the direction already described, after the lever arm has been disconnected therefrom, to permit removal of the blank from and chucking of a new blank on the blank spindle.

42. In a machine for producing gears, a tool support, tool mechanism mounted thereon, a blank support, a blank head mounted for angular adjustment on said blank support, a blank spindle journaled therein, means for moving said blank support, for feeding and indexing, in a direction perpendicular to the plane of operation of the tool mechanism including a cam shaft, a cam mounted thereon, and a lever arm adapted to operatively connect said cam and blank support, said lever arm being detachably connected to said blank support, a stop and a screw adapted to be adjusted into contact with said stop, one of which is carried by the blank support and the other by said lever arm, and separate means for moving said blank support in the direction described, after the lever arm has been disconnected therefrom, to permit removal of the blank from and chucking of a new blank upon the blank spindle.

ERNEST C. HEAD.
EYVIND FINSEN.
LEONARD O. CARLSEN.